(12) United States Patent
Chopra et al.

(10) Patent No.: US 9,977,704 B1
(45) Date of Patent: May 22, 2018

(54) AUTOMATED BACKUP AND REPLICATION OF VIRTUAL MACHINE DATA CENTERS

(71) Applicant: EMC IP Holding Company LLC, Hopkinton, MA (US)

(72) Inventors: Shelesh Chopra, Bangalore (IN); Vladimir Mandic, San Jose, CA (US); Mahipat Kulkarni, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 278 days.

(21) Appl. No.: 14/497,737

(22) Filed: Sep. 26, 2014

(51) Int. Cl.
| | | |
|---|---|---|
| *G06F 11/00* | (2006.01) | |
| *G06F 11/07* | (2006.01) | |
| *G06F 11/14* | (2006.01) | |
| *G06F 9/455* | (2018.01) | |

(52) U.S. Cl.
CPC ...... *G06F 11/0709* (2013.01); *G06F 9/45558* (2013.01); *G06F 11/0712* (2013.01); *G06F 11/0751* (2013.01); *G06F 11/0793* (2013.01); *G06F 11/1451* (2013.01); *G06F 11/1464* (2013.01); *G06F 11/1469* (2013.01); *G06F 2009/45583* (2013.01); *G06F 2009/45595* (2013.01)

(58) Field of Classification Search
USPC .......................................................... 714/15
See application file for complete search history.

(56) References Cited

U.S. PATENT DOCUMENTS

| | | | | |
|---|---|---|---|---|
| 2009/0216816 | A1* | 8/2009 | Basler ................. | G06F 11/1464 |
| 2011/0066597 | A1* | 3/2011 | Mashtizadeh ......... | G06F 3/0617 |
| | | | | 707/640 |
| 2011/0252271 | A1* | 10/2011 | Frenkel ............... | G06F 11/0712 |
| | | | | 714/4.1 |
| 2014/0201564 | A1* | 7/2014 | Jagtiani ................. | G06F 11/203 |
| | | | | 714/4.11 |
| 2014/0281700 | A1* | 9/2014 | Nagesharao ........ | G06F 11/1415 |
| | | | | 714/15 |
| 2016/0062858 | A1* | 3/2016 | Gallagher ........... | G06F 11/1484 |
| | | | | 714/6.23 |
| 2016/0077919 | A1* | 3/2016 | Duggan .............. | G06F 11/1446 |
| | | | | 714/15 |

* cited by examiner

*Primary Examiner* — Sarai E Butler
(74) *Attorney, Agent, or Firm* — Staniford Tomita LLP (57) ABSTRACT

Embodiments are described for automatic backup and replication of virtual machines in a virtual center. A system or processor-based operation defines policies governing backup conditions and criteria for backing up and recovering the virtual machines, continuously polls the VMs of the virtual center to determine the health or change in each virtual machine. A backup component backs up at least one VM by copying or transferring data including content and state information of the VM to a storage device or other virtual center. The system detects if a failure condition or change in excess of a defined threshold value exists for any virtual machine, and if so, initiates a recovery operation, and then sends a message to the system administrator regarding the backup and recovery.

18 Claims, 7 Drawing Sheets

AUTOMATED BACKUP AND REPLICATION OF VIRTUAL MACHINE DATA CENTERS

TECHNICAL FIELD

Embodiments are generally directed to virtual machine networks, and more specifically to automated methods and systems for backing up and replicating virtual machines and virtual machine data centers.

BACKGROUND

Backup and recovery software products are crucial for enterprise level network clients. Customers rely on backup systems to efficiently back up and recover data in the event of user error, data loss, system outages, hardware failure, or other catastrophic events to allow business applications to remain in service or quickly come back up to service after an outage. Data protection and comprehensive backup and disaster recovery procedures become even more important as enterprise level networks grow and support mission critical applications and data for customers.

As virtualization technology advances, many large scale networks are utilizing greater amounts of virtual machines (VMs). For example, Software Defined Data Centers (SDDC) are quickly becoming common as enterprises look to cost-effectively increase their resources by converting their physical datacenters to a virtual infrastructure. In a software-defined data center, all elements of the infrastructure, from networking, storage, CPU and security are virtualized and delivered as a service in an attempt to achieve IT (information technology) as a service. SDDCs are virtual datacenters (vCenters) that may include hundreds to thousands of virtual machines. Such infrastructure requires advanced methods of data protection to provide maximum value for the investment and provide adequate failover control for mission critical data. It is also important that backup operations be intelligent enough to conform to the requirements of the service level agreements (SLA) that set the terms of cloud computing arrangements. SLAs commonly include terms that address performance measurements, problem management, customer duties, warranties, disaster recovery, and other terms. In the shared infrastructure environment of cloud computing, SLAs focus on characteristics of the data center and the network to support end-to-end SLAs.

Current methods of performing backup operations in virtual centers are generally not sufficiently advanced enough to avoid potential issues related to data security and disaster recovery. One current method of backing up virtual centers is to use a manual schedule for a few VMs mapped to a backup policy. Though this method is better than legacy backup and replication techniques, it is still not sufficiently competent, and often fails to conform to the terms of aggressive SLA clauses with respect to backup performance and security. Present backup methods also still depend heavily on backup or system administrators and their personal experience to configure and schedule the backup policies. This is clearly not the most efficient way to backup entire virtual datacenters. Other shortcomings associated with present backup methods for virtual data centers includes sub-optimal use of storage and other resources through legacy methods of backup that are dictated by schedules that are hard coded in the system, and a lack of assurance that critical data is always backed up in a timely manner.

What is needed therefore, is a system that dynamically backs up virtual datacenters in a dynamic process that optimizes storage and resource usage, and that backs up data based on user customized criteria as opposed to a hardcoded schedule.

What is further needed is a system that provides robust security mechanisms to protect critical data, and that meets aggressive backup/restore timelines and SLA terms.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems of performing data backup in a virtual data center using change block technology (CBT) for VMs, or similar technology, and that ensures that changes are always tracked and backed up based on the user customized criteria. One aspect includes a method of replicating each VM from one vCenter to another vCenter in an automated manner. Such a method can be done based on the change at the vCenter level or the guest OS level. The replication operation can transfer data to another vCenter or the cloud, and the replication operation can be performed synchronously or asynchronously. In a virtual environment, the replication can be performed using the same hypervisor technology for the source and target vCenters, or to different hypervisors, for example VMware to Hyper V from vCenter to SCVMM. In an embodiment, replication is performed by using CBT technology in conjunction with a polling engine residing in the datacenter, which monitors and reports which vCenter/VM needs to be replicated. The system can also utilize a cache device in between the vCenters, especially in case of replication to the cloud.

Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
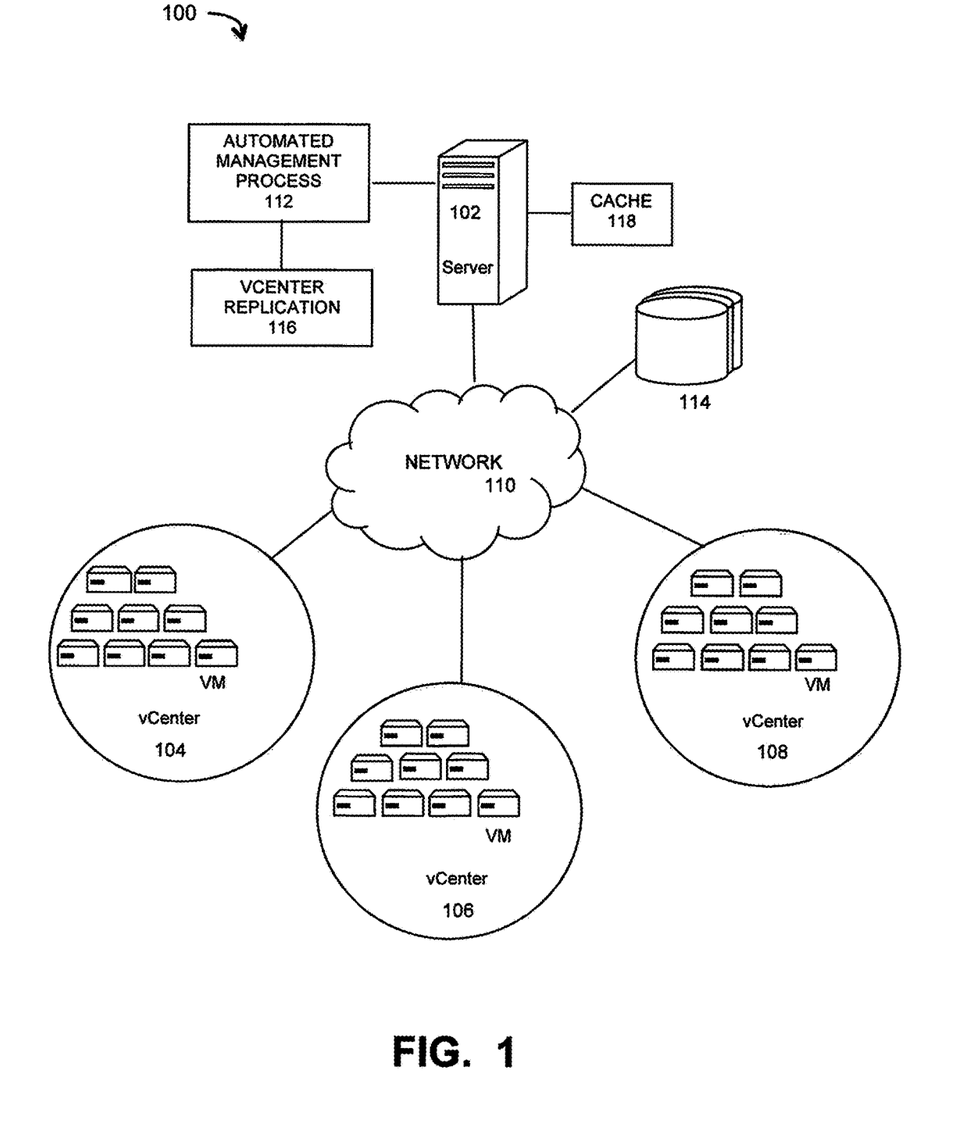
FIG. 1 is a diagram of a virtual datacenter network that implements an automated backup and replication system and method, under some embodiments.

FIG. 1 illustrates a computer network system 100 that implements one or more embodiments of an automated disaster recovery (DR) and replication system for virtual data centers. In system 100, a number of vCenters 104, 106, and 108 are coupled together via network 110, which may be a cloud network. A network server computer 102 is coupled directly or indirectly to these vCenters through network 110. Each vCenter contains or represents a physical or virtual network of many virtual machines (VMs), such as on the order of thousands of VMs each. The network system 100 may contain any number of such vCenters. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. Network 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated within system 100 may be stored in any number of persistent storage locations and devices, such as local client storage, server storage, or network storage 114. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity tape or drive (optical or magnetic) arrays. In an embodiment, the target storage devices, such as tape or disk array 114 may represent any practical storage device or set of devices, such as tape libraries, virtual tape libraries (VTL), fiber-channel (FC) storage area network devices, and OST (OpenStorage) devices.

For the embodiment of FIG. 1, network system 100 includes a server 102 that executes an automated vCenter DR/replication management process 112 (automated management process) that automates the backup and/or replication of vCenters. The process 112 uses certain known VM replication techniques 116, such as change block technology (CBT), or other technologies that can migrate VM images between hypervisor platforms, or from one hypervisor to another hypervisor. It also adds unique and powerful tools to efficiently create and manage backup/recover/migrate plans and schedules for each VM of a vCenter directly from one vCenter to another vCenter in an automated manner using a backup engine. As shown in FIG. 1, system 100 also includes a cache device 118 that is coupled to one or more components of the network and that is configured to provide temporary or intermediate storage for VM or vCenter data.

Figure 2:
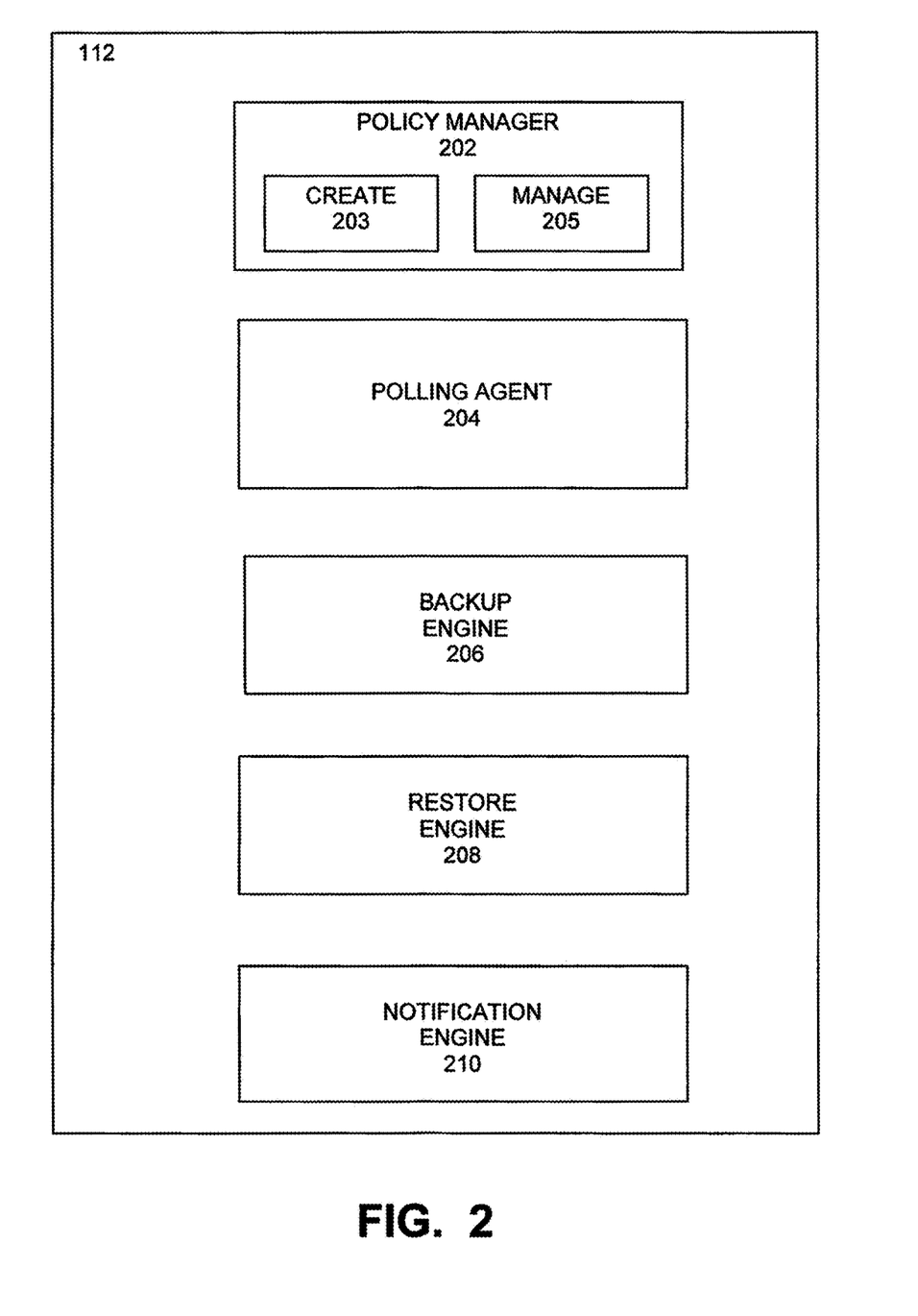
FIG. 2 is a block diagram illustrating the main functional components of an automated vCenter DR/replication management process and component, under some embodiments.

FIG. 2 is a block diagram illustrating the main functional components of an automated vCenter DR/replication management process and component, under some embodiments. A first component of management process 112 is a policy manager 202 that enables a user to create a policy 203 based on CBT factors provided by component 116. A policy management component 205 provides a mechanism whereby any changes in a previously backed up VM triggers the policy saying the VM has been modified and should be migrated to another vCenter based on the kind of policy that has been created. A polling agent 204 checks the amount of change in the VM on a regular basis as per a defined policy. Once the changed blocks reach the defined threshold for changed amount or percentage, the VM is replicated to another vCenter using the backed up data for the VM automatically with all the new changed data using backup engine 206. Such a process can be used for both backup operations as well as replication, as will be described in greater detail below.

In an embodiment, some or all of the VMs of a vCenter may be backed up and restored or replicated, including single VMs at any one time. The management process 112 includes or utilizes APIs (application program interfaces) to connect one vCenter to another vCenter. The polling agent 204 continuously polls each VM to determine the VM availability and health, and the server 102 can send an e-mail or message through a notification engine 210 to the system administrator if the VM goes down. The management process 112 also includes a recover process 208 that enables the policy to be capable of restoring the VM from the DR site/Restore point back to original location. The system can also be configured to power on the VM upon restore or leave the VM idle upon restore.

The management process 112 provides sub-processes or components that facilitate automatic failover of VMs or vCenters in the event of system faults, data corruption, or hardware/software crashes. The automatic failure processes include agents that receive automatic alerts about possible site failure and initiate recovery plan execution from a vCenter server automatically in accordance with the defined policy or policies. It also includes mechanisms for automated boot of protected virtual machines with pre-specified boot sequence, and automated reconfiguration of virtual machine IP addresses at the failover site.

In an embodiment, the system administrator uses the policy manager 202 to create and modify defined policies that are used by the other components of the automated management process 112. The defined policies include various rules and parameter definitions that dictate the backup schedules, restore schedules, alert triggers, backup methods, and other relevant conditions and rules. Policies may also be defined by other components in the process 112, such as the backup and polling engines.

Figure 3:
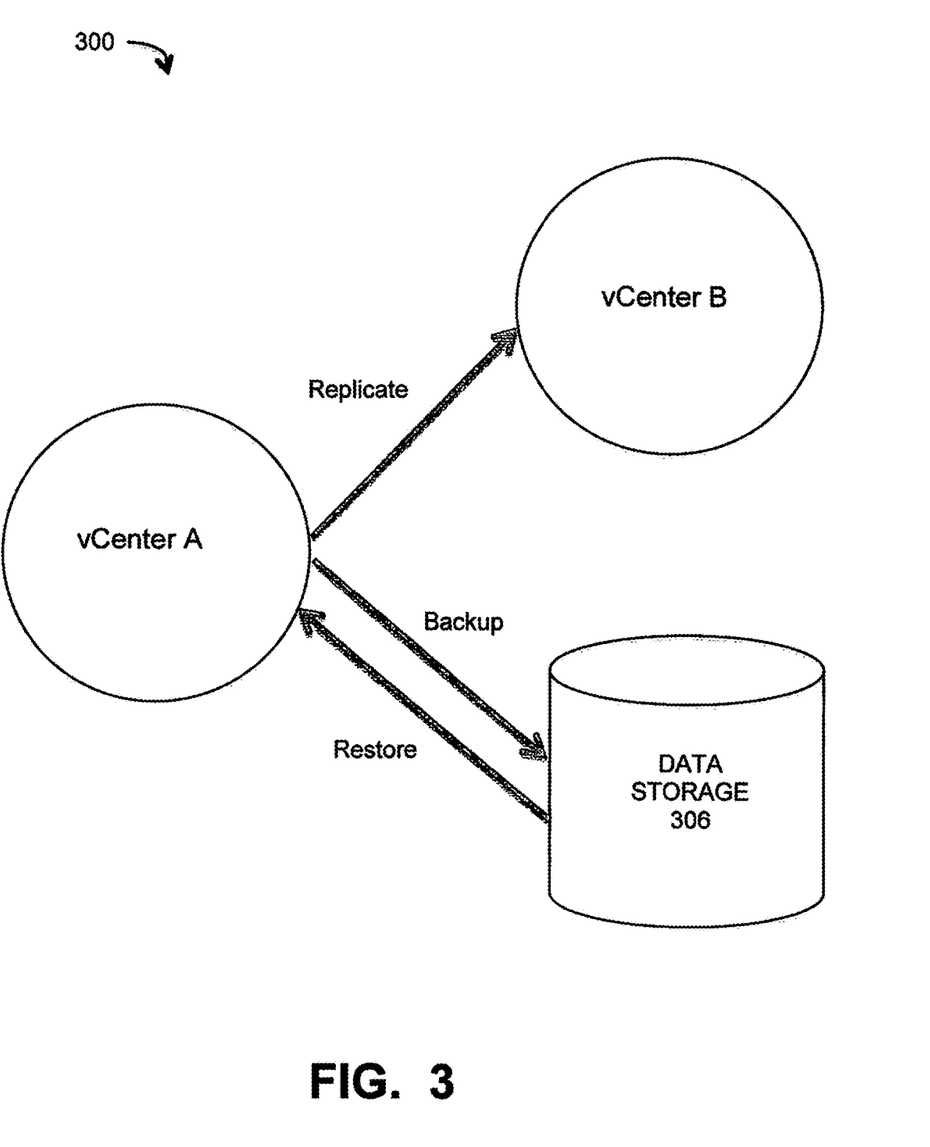
FIG. 3 illustrates the operation of replication or backup that might be initiated by the automated management process, under some embodiments.

The backup engine 206 backups the VMs of a vCenter by transferring the data from a VM to a different storage location or site for purposes of either replication or backup. FIG. 3 illustrates the operation of replication or backup that might be initiated by the automated process, under some embodiments. As shown in FIG. 3, replication involves transferring the data and states of one vCenter (vCenter A) to another vCenter (vCenter B). In the case of a disaster recovery (DR) environment, vCenter B represents a DR site that is available if vCenter A suffers catastrophic failure. Upon transfer and initiation, the VMs of vCenter A should function in the new cite, vCenter B, just as they did prior to vCenter A going down. Replication generally provides fast recovery times and high security since the state of the original vCenter is transferred entirely to another vCenter, but requires that a second vCenter be set up or taken over to replicate the first vCenter. In contrast to replication, the backup operation involves copying the VMs of vCenter A to a data storage medium 306. Backup operations are generally efficient and cost-effective, since data storage is usually readily available on the network. However, to recover the function of vCenter A, the VMs must be restored by the reverse process of transferring the VM data to the vCenter, once it is back in service, such as through restore engine 208.

This entire backup and restore procedure may take longer than the replication process, though the backup process itself may be more efficient than the replication process. System constraints and requirements generally dictate which recovery method (restore or replicate) is preferred, but in general, applications involving large amounts of mission critical data usually prefer replication as a form of disaster recovery, with the target site (e.g., vCenter B) serving as a disaster recovery site (DR site).

Unless otherwise stated the term "backup" refers to the transfer of VM data and state information from a VM or vCenter to a storage location that may either be a target vCenter or data storage media. If the term "replication" is used, it should be understood to mean transferring VM data from one vCenter to another vCenter. The term "storage box" may be used to denote the medium, device, location or component that stores the backups/replicas of the VM data for all of the backed up VMs. It may thus refer to either or both of the DR site or data storage 306, and may be the same as a backup device. In general a storage box may be local to the server 102, remotely coupled to the server through another link or network, or in the cloud.

In an embodiment, process 112 performs the backup of all VMs of a vCenter in parallel. Thus, process 112 maintains many parallel threads for backup and replication operations. If, under any circumstance, serial VM data transfer is required or desired, a policy can be defined by the backup engine to note serial versus parallel backup, however, the default favored mode is parallel backup of VMs. The backup/replication operation can also be synchronous or asynchronous. In the synchronous case, the backup/replicate operation is performed as soon as a change in a VM is observed. In the asynchronous case, the operation commences after a defined lag has occurred between the change or failure of a VM and the DR period. The backup engine may define a policy dictating synchronous/asynchronous operation, with synchronous being the preferred default condition in some embodiments.

The backup engine 206 causes the VMs of a vCenter to be transferred or copied when a change is detected in any of the VMs, or an alert is received about possible site failure, such as in the automated failover configuration. With regard to the trigger condition being a change in a VM, the backup engine can define trigger criteria, such as a minimum percentage change in a VM, or any change in a minimum number of VMs of the vCenter. For example, the backup engine may define criteria such as: (1) backup/replicate when there is certain percentage change (e.g., 5% or 10% change) in the data of a VM, or (2) backup/replicate if more than X number of VMs within the vCenter have changed, or X percent of VMs have changed. The backup engine may employ certain known methods of VM comparison technology to detect a change, such as CBT or other similar methods. Once the VMs are replicated, a policy may be defined that automatically brings up the VM on the DR site (e.g., vCenter B) if it is detected that the primary site (e.g., vCenter A) is down. In the case of backup, the policy may be defined such that the VM is brought up once the backed up VM is successfully restored to the site (e.g., vCenter A). In a backup/replication operation, all relevant data and information from a VM is transferred, such as application and content data, state information, configuration parameters, system definitions, metadata, and any other relevant data that is needed to ensure operation of the VM.

In an embodiment, the polling agent 204 checks the health status and any change in bytes for all VMs of the vCenter. Health refers to the status of the VM as either up/available or failed/not available, as well as any other relevant status, such as idle/available, suspended, on standby, and so on. With regard to change of data in a VM, a minimum number of byte changes is defined to set a trigger condition that will signal an alert based on a changed VM. If the polling engine detects such a change in a VM, or a change in the health of a VM, it can cause a message to be sent through the notification engine 210 to the system administrator. In an embodiment, any changed VM data is stored in cache memory, such as cache 118 of server 102. Such a cache is used in the event that the system needs to transfer data over a network (WAN/LAN) to the cloud. The cache 118 provides an intermediary role to host the changed data and then transfer the same to the replication/DR site (e.g., vCenter B) or the backup media 306.

The notification engine 210 is configured to notify the system administrator the about events and progress, such as: changes to VMs that are less than defined threshold criteria, changes that exceed the threshold and will thus trigger the backup/replication operation, the status of backup/replication operation that is in progress, that a backup/replication operation is completed with success/fail/warnings. The notification engine 210 may also be configured to send messages to the user, either directly or through the system administrator for certain conditions such as: if any VM is down, or once a VM is brought up at the DR site or is restored. Notifications to the system administrator or any relevant users may be provided by the notification engine on a continuous periodic basis, or they may be provided non-periodically, such as on an as-needed basis, on a polled basis, or when a triggering event occurs.

The backup engine 206 initiates data transfer operations from VMs to either another vCenter in the event of a replication operation, or storage media in the event of a backup and restore operation. In general, known backup methods are performed by the backup engine for backup/restore operations. Likewise, for replication operations, known methods of replicating VMs maybe used by the backup engine. In one embodiment, a VM replication program, such as the VMware Site Recovery Manager (SRM) may be used. SRM provides replication of virtual machines to a secondary site, and requires an underlying replication product to copy virtual machine data to the secondary site. For example, replication functions can be provided either by a built-in vSphere replication or by a third-party storage-based replication product. In general, replication using vSphere provides cost-efficient and simple replication for smaller sites and Tier 2 applications.

Figure 4:
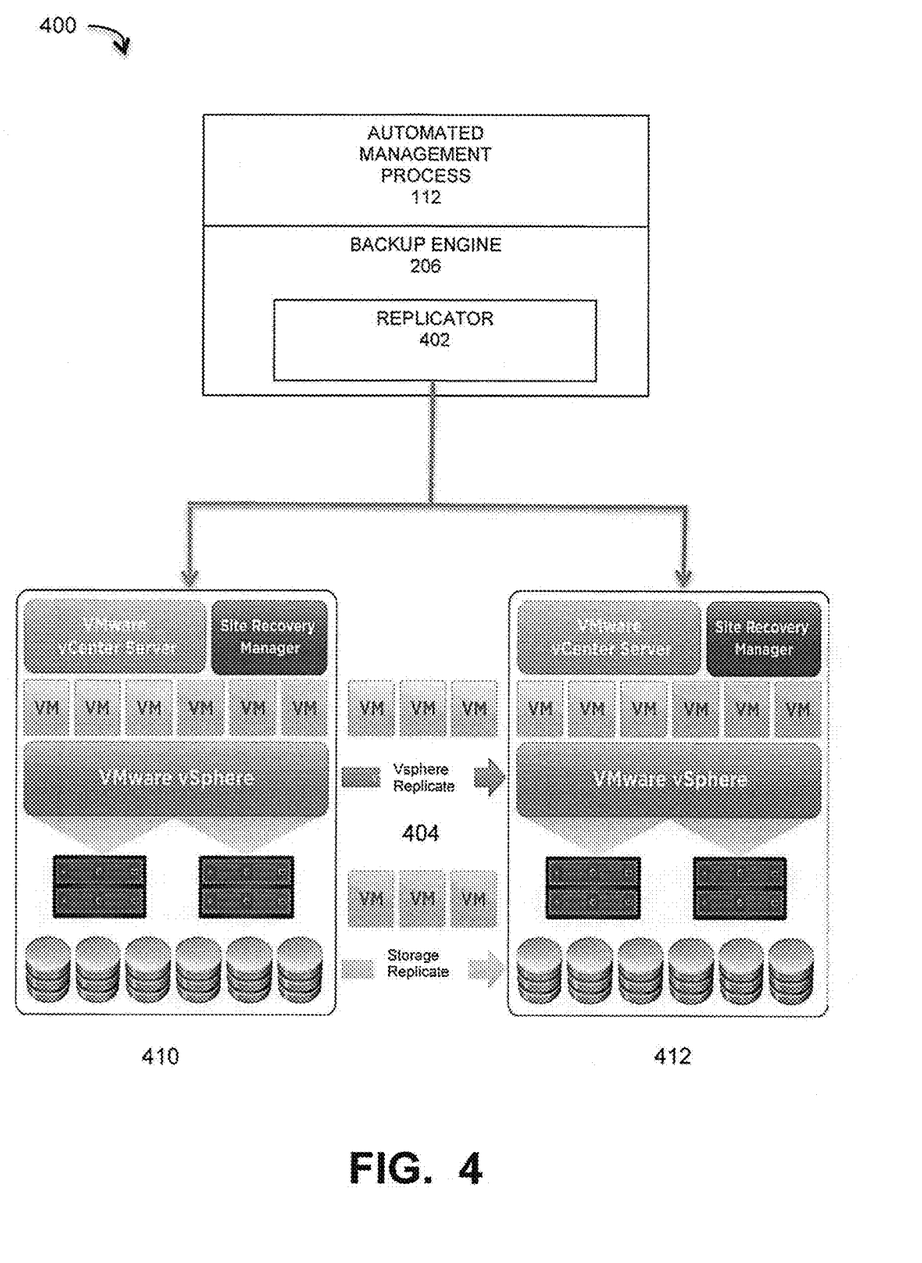
FIG. 4 is a block diagram illustrating the operation of an automated management process with a backup engine and replicator, under some embodiments.

In an embodiment and implementation that is distinct from present known VM replication solutions, the automated management process 112 and backup engine 206 allow the replication process to be decoupled from backup application and policies. Certain automated replication technologies, such as SRM, are leveraged through backup policy that maintains a high level of transparency, cataloging and control from a centralized backup plane, and allows for automated checking of VM states and triggering of backup operations. FIG. 4 is a block diagram illustrating the operation of an automated management process with a backup engine and replicator, under some embodiments. As shown in system 400, the backup engine 206 of automated management process 112 controls a vCenter replication process 404, such as a VMware SRM system, as shown, though embodiments are not so limited. Upon initiation of a replication operation, the replication process replicates VMs from one vCenter or site 410 to another site 412. For the embodiment shown, the vCenter replication process comprises both a Vsphere replication operation and a storage replication operation. In general, the system 400 can replicate VMs if there is replication enabled VM, such as shown in FIG. 4. Alternatively, the system can utilize a CBT-style backup to perform near-CDP (continuous data protection) replication. For example, the system 400 can take CBT backups on the order of one per hour, or even shorter periods, and then synthesize the VMs on the target site 412.

As is known, virtual machine environments utilize hypervisors to create and run the virtual machines. A computer running the hypervisor is a host machine and all virtual machines are guest machines running guest operating systems (OS). The hypervisor provides the guest OSs with a virtual operating platform and manages the execution of the VMs. When replicating VMs between two sites, the source and target sites may use the same hypervisor or they can use different hypervisors. In an embodiment, the replication system 400 includes a replicator component 402 that performs the conversion from one hypervisor to another hypervisor for instances in which two different hypervisors are present. The replicator utilizes APIs (application program interfaces) to perform the necessary conversion tasks. Based on the source and target vCenters, the backup/replication engine 206 will call the specific APIs for conversion. An example of replication in different types of vCenters would be to replicate from a VMware hypervisor to a Microsoft vCenter using an SCVMM (system center virtual machine manager). In this case, the API leveraging mechanism would use WMI (Windows Management Instrumentation) to convert VDDK (Virtual Disk Development Kit) into a VHD (virtual hard disk) file format. Similar kinds of implementation are also possible for other hypervisors that support such conversions.

In an embodiment, the system interacts and interfaces with an orchestrator (e.g., VMware vCenter or Microsoft Service Center or similar) on both the source and target side. When a VM is selected for replication process, the system 400 can create and register that VM in a target hypervisor by using the converter API. For cloud implementations, this mechanism can be used for VM transfer for disaster recovery purposes from on-premise (e.g., VM sitting in hypervisor within a data center) to cloud (e.g., VM sitting in the cloud, such as Azure or vCHS).

Replication system 400 provides several advantages over traditional SRM methods. For example, the system 400 is hypervisor agnostic and can replicate any VM from any orchestrator, and between any two hypervisor environments. The system is also tightly coupled and integrated with strictly defined backup products and policies. The system is not dependent upon any specific replication technology, and in fact, will leverage the replication methodologies and the converter API to provide end-to-end workflow. The cache device 118 provide a staging location which helps replicating in cloud and when the primary and DR sites are far apart.

Figure 5:
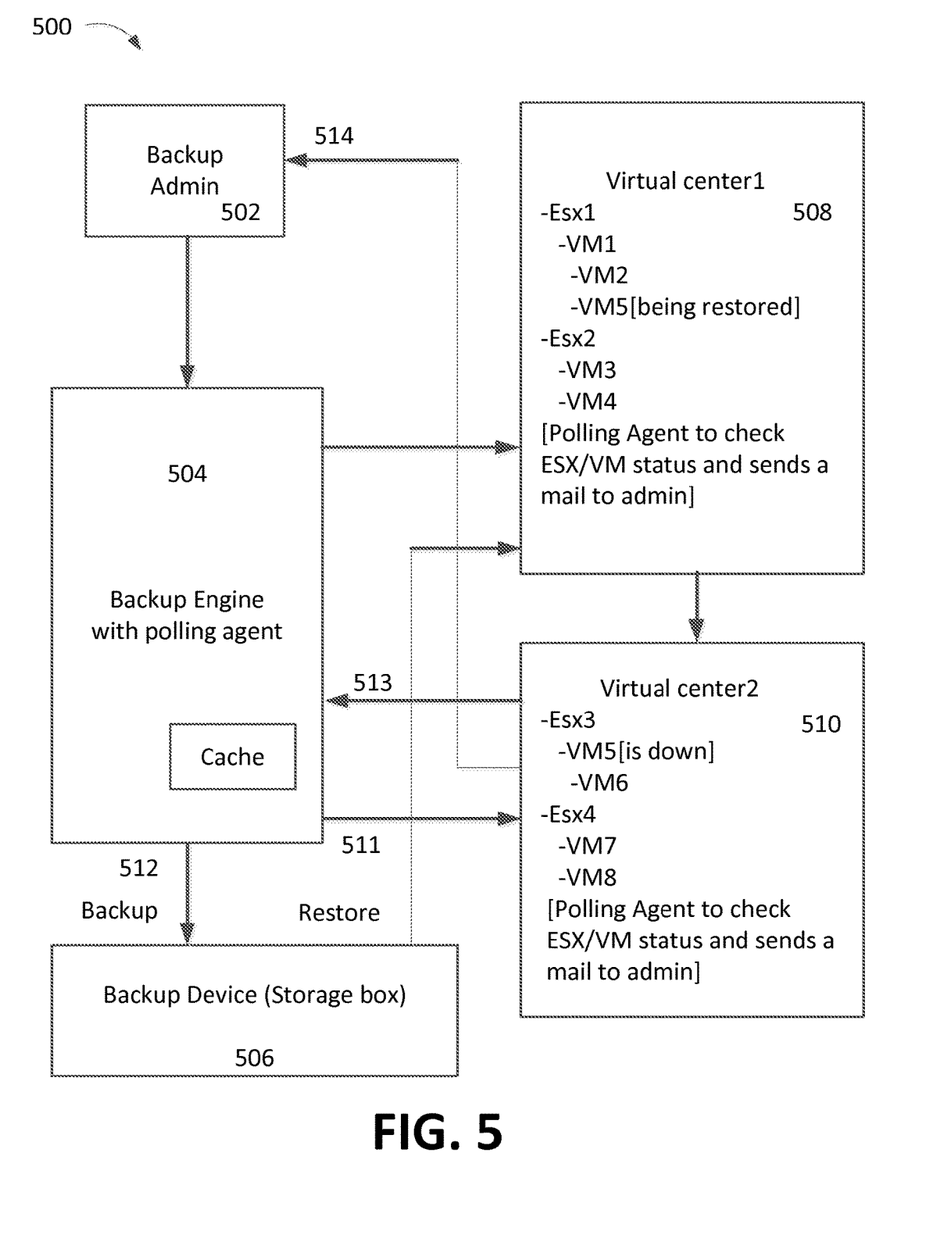
FIG. 5 illustrates the functional components and processing steps in performing a vCenter restore/DR operation, under some embodiments.

FIG. 5 illustrates the functional components and processing steps in performing a vCenter restore/DR operation, under some embodiments. As shown in processing system 500, a backup and restore operation for vCenter 510 (denoted Virtual Center 2) is performed. The polling agent of backup engine 504 performs a continuous check of the VMs in Virtual Center 2 as shown by arrow 511 denoting this operation. The polling agent performs a check of each VM to detect any byte change in excess of the threshold set by the backup administrator 502, or by an automated process or default setting. The polling agent is able to determine a potential problematic condition through its scheduled polling of the health of the vCenter. The backup engine can initiate a backup operation of the vCenter in accordance with a regular backup schedule or upon indication by the polling agent that a VM may have changed, operation 512. The backup operation 512 transmits a copy of the VM data to a backup device (storage box) 506. The polling agent continues to check the health of vCenter 2, and upon a check of status by the polling agent, the vCenter returns the health of the VMs, operation 513. As can be seen in the example scenario of FIG. 5, VM5 of vCenter 2 is down. In this case, the vCenter administrator sends a message (e.g., e-mail, text message, or other alert) to the backup administrator 502 saying that a VM is down, operation 514. The backup administrator 502 can then initiate a restore operation 515 of vCenter 2 onto another vCenter 508 (denoted Virtual Center 1) and power on the VM after the restore operation is complete. In this manner, the state, data and functionality of vCenter 2 is recovered after the failure of VM5 through the restore operation.

Figure 6:
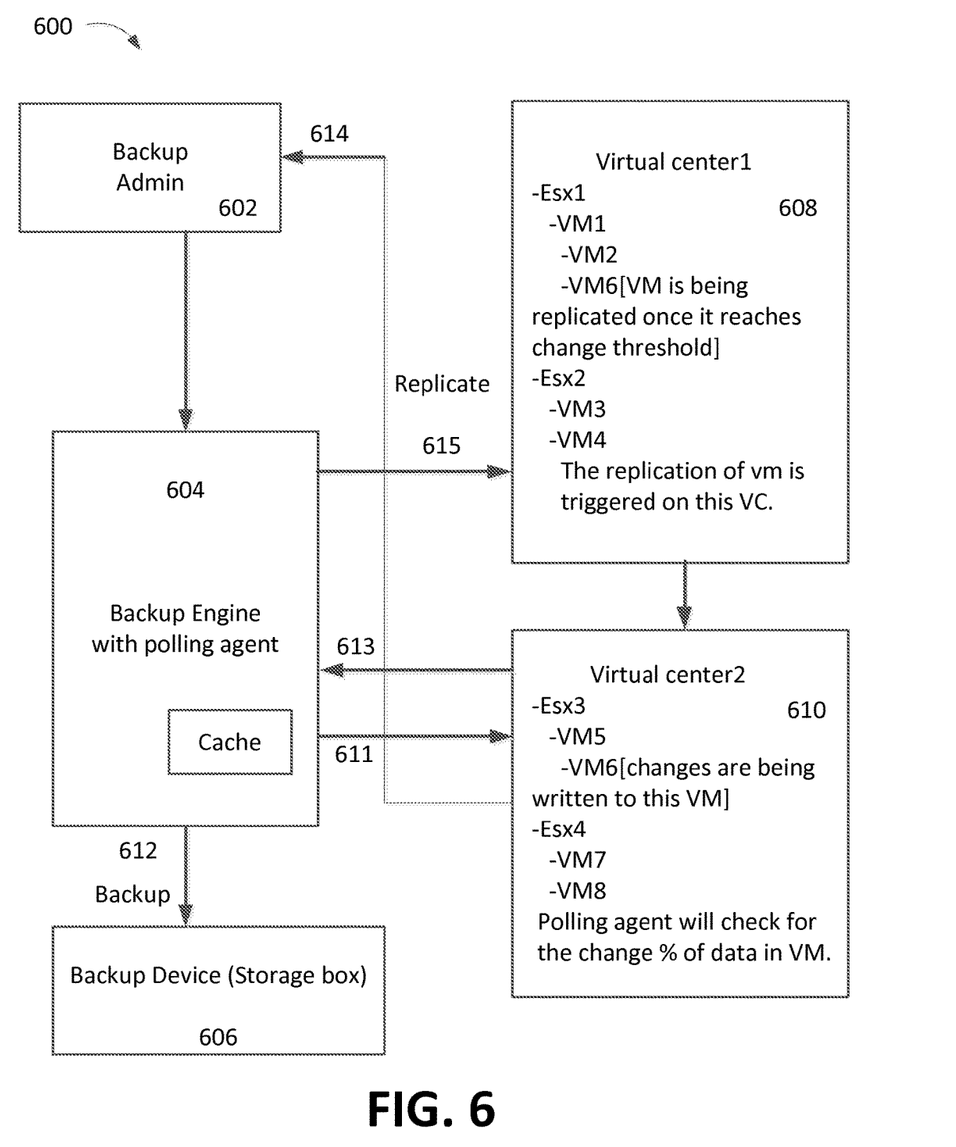
FIG. 6 illustrates the functional components and processing steps in performing a vCenter replication operation, under some embodiments.

As shown in FIG. 3, an alternative to the backup/restore operation of FIG. 5 is a replication operation. FIG. 6 illustrates the functional components and processing steps in performing a VM replication operation, under some embodiments. In polling operation 611, the polling agent of backup engine 604 checks the health of the VMs of vCenter 610 (denoted Virtual Center 2). The polling agent performs a check of each VM to detect any byte change in excess of the threshold set by the backup administrator 602, or by an automated process or default setting. The polling agent is able to determine a potential problematic condition through its scheduled polling of the health of the vCenter. The backup engine can initiate a backup operation of the vCenter in accordance with a regular backup schedule or upon indication by the polling agent that a VM may have changed, operation 612. The backup operation 612 transmits a copy of the VM data to a backup device (storage box) 606. The polling agent continues to check the percentage change of each VM of vCenter 2, and upon a check of status by the polling agent, the vCenter returns the change status of the VMs, operation 613. As can be seen in the example scenario of FIG. 6 VM6 of vCenter 2 is being changed and the polling agent checks whether the amount of change in the VM exceeds a defined threshold. In this case, the vCenter administrator sends a message (e.g., e-mail, text message, or other alert) to the backup administrator 602 saying that a VM is changed, operation 614. The backup administrator 602 can then initiate a replication operation 615 of VM6 onto another VM of vCenter 608 (denoted Virtual Center 2). The user can be notified after the replication operation is complete. In this manner, the state, data and functionality of VM6 is recovered by the replication operation.

Figure 7:
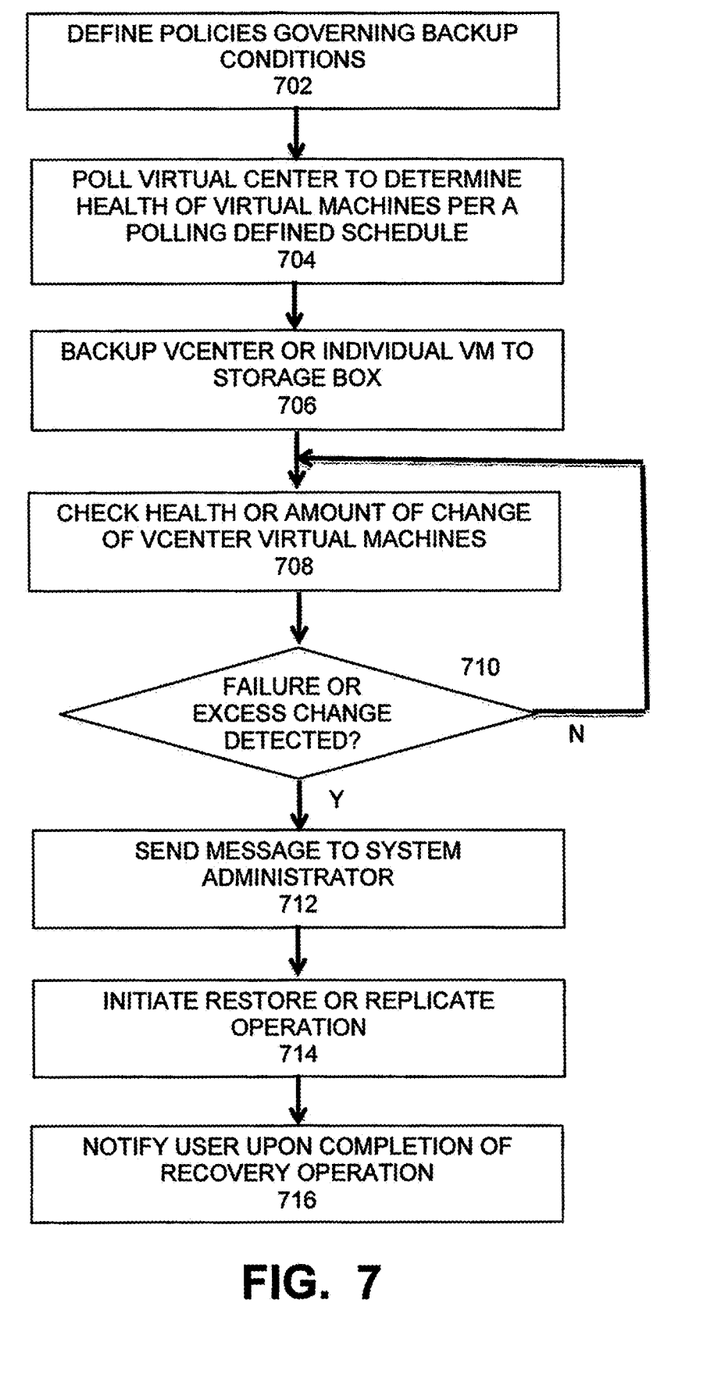
FIG. 7 is a flowchart that illustrates a process of performing automated backup and replication of virtual machines, under some embodiments.

FIG. 7 is a flowchart that illustrates a process of performing automated backup and replication of virtual machines, under some embodiments. The process begins with the definition of policies governing backup conditions and criteria for administration by a policy manager component, block 702. The policies generally set out rules that determine whether or not backup/replicate/restore operations should be performed on VMs based on criteria such as percentage byte change of a VM, VM status or health, synchronous/asynchronous operation, and other similar conditions and criteria. A polling agent of the backup engine continuously polls the VMs of a vCenter to determine the health or amount of change in each VM in accordance with a defined polling schedule, block 704. The polling schedule may be a regular periodic schedule set by the user or system, such as every minute, hourly, daily, and so on, depending on system characteristics and constraints. The backup engine backs up the vCenter or any individual VM of the vCenter by copying or transferring data including content and state information of the VM to a storage box, block 706. This backup operation 706 may be performed in accordance with a normal backup schedule or in response to an alert or indication that a particular VM may have a problem or be undergoing a change. The storage box may be another vCenter or it may be a storage medium that is networked or coupled directly or indirectly to the backup server. The polling agent continues to check the health or amount of change in the vCenter VMs, block 708. If any failure condition or change in excess of the defined threshold is detected, block 710, a message indicating the condition is sent to the system administrator by a notification engine, block 712. Depending upon an action of the system/backup administrator, or in response to an automatic trigger, the backup engine can initiate a restore or replication operation to recover functionality of the changed or faulty VM or entire vCenter, block 714. The user may then be notified upon completion of the recovery operation, block 716.

Embodiments of the automated management process implements a dynamic way of backing up VMs and vCenters using CBT, or similar technology and ensures that changes are always tracked and backed up based on user customized criteria. This process also helps ensure optimal use of storage and other resources through the use of customized and scalable backup schedules as compared to present legacy methods of backup that are dictated by hard-coded schedules.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method comprising:
defining policies in a policy manager component of a manager component having a backup engine, governing backup conditions and criteria for backing up and recovering data between virtual machines (VMs) in a first virtual center having a first hypervisor and VMs in a second virtual center having a different hypervisor;
automatically and continuously polling, in a polling agent of the backup engine, the VMs of the first virtual center to determine a health and an amount of changed data blocks in each VM in accordance with a defined polling schedule;
backing up, in a backup operation executing the backup engine, at least one VM of the first virtual center by copying or transferring data including content and state information of the VM to a storage box;
detecting, through the continuous polling, if a failure condition or change in excess of the threshold value exists for any VM of the first virtual center; and
initiating, through a restore component, a recovery operation if the failure condition or the change is detected, wherein the recovery operation is decoupled from the backup operation through the policy manager and polling agent of the backup engine to allow replication of data between the first and second virtual centers having different hypervisors.

2. The method of claim 1 further comprising transmitting a message to a system administrator indicating a status of the any VM if the failure condition or the change is detected, and wherein the policy manager component creates policies including rules and parameter definitions dictating at least one of: backup schedules, restore schedules, alert triggers, and backup methods, and further wherein the policies are based on change block technology (CBT) factors that defines a threshold value for an amount of change in each VM.

3. The method of claim 1 wherein the storage box comprises a backup storage device and media, and the recovery operation comprises a restore operation transferring the copied or transferred data from the backup storage media to the second virtual center.

4. The method of claim 1 further comprising a replicator component configured to perform conversion from the first hypervisor to the second hypervisor.

5. The method of claim 2 wherein the recovery operation is initiated by one of a command from the system administrator, or an automatic process initiated by a backup server.

6. The method of claim 1 wherein the policies comprise rules that determine whether or not the recovery operation should be performed the any VM based on criteria selected from the group consisting of: percentage byte change for files of a VM relative to the threshold value, any change to a minimum number of VMs in the virtual center, a failure indication of a VM, and an unavailable indication of a VM.

7. The method of claim 6 wherein the policies further comprise initiating the recovery operation synchronously or asynchronously after a defined time with respect to any change to the changed data blocks of a VM.

8. The method of claim 1 wherein the polling schedule is a regular periodic schedule defined within a backup server and dependent on one or more characteristics and constraints of a network environment containing the first virtual center and the second virtual center.

9. The method of claim 1 further comprising storing the changed VM data in cache memory of the backup engine.

10. A system comprising:
a policy manager having a hardware implemented backup engine and defining policies governing backup conditions and criteria for backing up and recovering data between virtual machines (VMs) in a first virtual center having a first hypervisor and VMs in a second virtual center having a different hypervisor;
a hardware implemented polling agent of the backup engine continuously polling the VMs of the first virtual center to determine a health and an amount of changed data blocks in each VM in accordance with a defined polling schedule;
the backup engine backing up at least one VM of the VMs of the first virtual center in a backup operation by copying or transferring data including content and state information of the VM to a storage box, the polling agent detecting if a failure condition or change in excess of the threshold value exists for any VM of the first virtual center;
a notification engine transmitting a message to a system administrator indicating a status of the any VM if the failure condition or the change is detected; and
a restore component initiating the recovery operation if the failure condition or the change is detected, wherein the recovery operation is decoupled from the backup operation through the policy manager and polling agent of the backup engine to allow replication of data between the first and second virtual centers having different hypervisors.

11. The system of claim 10 wherein the storage box comprises a backup storage device and media, and the recovery operation comprises a restore operation transferring the copied or transferred data from the backup storage media to the second virtual center, and wherein the backup storage device is selected from at least one of a magnetic tape device, an optical disk array, a magnetic disk array, and a virtual memory storage.

12. The system of claim 11 wherein the policies are based on change block technology (CBT) factors that defines a threshold value for an amount of change in each VM, and further comprising a cache memory of the backup engine, and storing the changed VM data, and a replicator component configured to perform conversion from the first hypervisor to the second hypervisor.

13. The system of claim 10 wherein the policy manager component creates policies including rules and parameter definitions dictating at least one of: backup schedules, restore schedules, alert triggers, and backup methods.

14. The system of claim 12 wherein the recovery operation is initiated by one of a command from the system administrator, and an automatic process initiated by a backup server.

15. The system of claim 10 wherein the policies comprise rules that determine whether or not the recovery operation should be performed the any VM based on criteria selected from the group consisting of: percentage byte change for files of a VM relative to the threshold value, any change to a minimum number of VMs in the virtual center, a failure indication of a VM, and an unavailable indication of a VM.

16. The system of claim 15 wherein the policies further comprise initiating the recovery operation synchronously or asynchronously after a defined time with respect to any change to the changed blocks of a VM.

17. The system of claim 10 wherein the polling schedule is a regular periodic schedule defined within a backup server and dependent on one or more characteristics and constraints of a network environment containing the first virtual center and the second virtual center.

18. A computer program product comprising a non-transitory computer usable medium having machine readable code embodied therein for:

defining policies in a policy manager component of a manager component having a backup engine, governing backup conditions and criteria for backing up and recovering data between virtual machines (VMs) in a first virtual center having a first hypervisor and VMs in a second virtual center having a different hypervisor;

automatically and continuously polling, in a polling agent of the backup engine, the VMs of the first virtual center to determine a health and an amount of changed data blocks in each VM in accordance with a defined polling schedule;

backing up, in a backup operation executing the backup engine, at least one VM of the first virtual center by copying or transferring data including content and state information of the VM to a storage box;

detecting, through the continuous polling, if a failure condition or change in excess of the threshold value exists for any VM of the first virtual center; and initiating, through a restore component, a recovery operation if the failure condition or the change is detected, wherein the recovery operation is decoupled from the backup operation through the policy manager and polling agent of the backup engine to allow replication of data between the first and second virtual centers having different hypervisors.

* * * * *